(12) United States Patent
Kanayama et al.

(10) Patent No.: US 6,176,426 B1
(45) Date of Patent: Jan. 23, 2001

(54) CARD READER AND METHOD OF INSTALLING A CARD READER

(75) Inventors: Yasuhiro Kanayama, Osaka; Hajime Oki, Hyogo, both of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/512,850

(22) Filed: Feb. 25, 2000

Related U.S. Application Data

(62) Division of application No. 09/003,351, filed on Jan. 6, 1998, now Pat. No. 6,042,010.

(30) Foreign Application Priority Data

Jan. 10, 1997 (JP) ........................................................... 9-2655
Oct. 28, 1997 (JP) ....................................................... 9-295133

(51) Int. Cl.$^7$ ..................................................... G06K 7/08
(52) U.S. Cl. ........................... 235/449; 235/379; 235/439
(58) Field of Search ..................................... 235/449, 379, 235/380, 439, 446, 475, 492, 493; 902/25, 27

(56) References Cited

U.S. PATENT DOCUMENTS

| | | |
|---|---|---|
| 3,926,021 * | 12/1975 | Gonest et al. ............................. 70/278 |
| 4,687,268 | 8/1987 | Picciotto et al. ...................... 439/55 L |
| 4,947,029 | 8/1990 | Kurihara et al. ....................... 235/475 |
| 5,484,989 * | 1/1996 | Kumar et al. .......................... 235/435 |
| 5,532,466 | 7/1996 | Konno et al. .......................... 235/441 |
| 5,698,832 | 12/1997 | Someya et al. ....................... 235/449 |
| 5,892,210 | 4/1999 | Levasseur ............................. 235/380 |

FOREIGN PATENT DOCUMENTS 8-279240    10/1996    (JP).

* cited by examiner

*Primary Examiner*—Michael G Lee
(74) *Attorney, Agent, or Firm*—Pearne & Gordon

(57) ABSTRACT

A card reader main unit includes has a magnetic head, a magnetic head holding device, and a partition wall. The magnetic head reads contents recorded in a card. The magnetic head holding device swingably holds the magnetic head. The partition wall prevents foreign materials from invading the card reader main unit. The partition wall has an opening through which the magnetic head holding device is inserted. An invasion preventing device is attached to the opening for the holding device, and has an opening through which the magnetic head is inserted and which is in close contact with the periphery of the magnetic head. Only a card data reading portion of the magnetic head is allowed to protrude through the opening to the card insertion face of the card reader main unit, whereby invasion of foreign materials from the outside is prevented.

15 Claims, 14 Drawing Sheets

CARD READER AND METHOD OF INSTALLING A CARD READER

CROSS REFERENCE TO RELATED APPLICATION

The present application is a division of application Ser. No. 09/003,351 filed Jan. 6, 1998, which issued as U.S. Pat. No. 6,042,010.

BACKGROUND OF THE INVENTION

The invention relates to a card reader for reading information recorded on a card.

In a conventional card reader, a card reader main unit has an insertion slot cover into which a card is to be inserted. A circuit unit for processing information of the card is mounted on the upper face of the card reader main unit which is behind the insertion slot cover. A partition wall for preventing a foreign material from invading the circuit unit is situated in the card reader main unit. A magnetic head holding means protrudes from the card reader main unit to the inside of the insertion slot cover through the partition wall. A magnetic head for reading information of the card is situated on the magnetic head holding means.

Such a conventional card reader is often installed outdoors. In a case where the card reader is used in a place of severe weather conditions, the following problems arise.

Since the partition wall is attached to the card reader main unit, invasion of a foreign material into the circuit unit situated on the upper face of the card reader main unit is inhibited. However, the card reader is not provided with means for preventing a foreign material from invading through gaps such as a gap between the magnetic head and a magnetic head attaching hole of the card reader main unit, and a gap in a portion where the insertion slot cover is fitted onto the card reader main unit.

If a foreign material (such as water or gasoline) adheres to a terminal portion of the magnetic head in which a lead wire for transmitting information read from the card to the circuit unit is soldered, therefore, electric insulation of the circuit cannot be achieved in the terminal portion of the magnetic head serving as an input unit of information. Thus, the card data cannot be read.

In some cases, ice, mud, or the like adheres to a spring for causing the magnetic head to contact with the magnetic head under pressure, a spring groove, side faces of the magnetic head, or the like, so that movement of the magnetic head is obstructed. Thus, there exists a problem in that the card data cannot be-properly read.

SUMMARY OF THE INVENTION

The invention solves the above-discussed problems. It is one object of the invention to provide a card reader in which a foreign material, and especially water, mud, dust, or the like is prevented from invading a circuit system including a magnetic head.

(1) In order to attain the object, the first card reader of the invention comprises: a card reader main unit having a card passage; a magnetic head which is situated in the card reader main unit and which protrudes to the card passage to read contents recorded on a card; and invasion preventing means for preventing a foreign material from externally invading the card reader main unit, the invasion preventing means being in close contact with a periphery of the magnetic head.

(2) The second card reader of the invention further comprises magnetic head holding means for swingably holding the magnetic head, and a partition wall which prevents a foreign material from invading the card reader main unit, the partition wall comprises an opening for the holding means into which the magnetic head holding means is inserted, and the invasion preventing means comprises a protrusion which is attached to the opening for the holding means and which covers the magnetic head holding means, the protrusion comprising an opening for the magnetic head into which the magnetic head is inserted, the opening for the magnetic head being in close contact with the periphery of the magnetic head.

(3) In the third card reader of the invention, the invasion preventing means is made of an elastic member, and a portion of the invasion preventing means which is in close contact with the periphery of the magnetic head is larger in thickness than other portions.

(4) The fourth card reader of the invention further comprises an insertion slot cover which is fitted onto the card reader main unit and which protects the magnetic head, and the card reader main unit comprises a main body opening through which the magnetic head protrudes to the card passage, and the card reader further comprises an elastic member which is attached to the main unit opening as the invasion preventing means and which is in close contact with the periphery of the magnetic head, and second invasion preventing means which is situated in a portion where the insertion slot cover is fitted onto the card reader main unit.

(5) The fifth card reader of the invention comprises: a card reader main unit having a card passage; a magnetic head which is situated in the card reader main unit and which protrudes to the card passage to read contents recorded on a card; a circuit unit which processes data read by the magnetic head; a partition wall which prevents a foreign material from invading the circuit unit; and a lead wire which connects the magnetic head to the circuit unit, a water proof material being applied to a portion where the magnetic head is connected to the lead wire.

Further, it is another object of the invention to provide a card reader having a compact structure in which, even if a foreign material, especially water, mud, dust, or the like enters the inside of the card reader, the foreign material can be immediately discharged through a card passage.

(6) In order to attain the object, the sixth card reader of the invention comprises: a card insertion slot into which a card is to be inserted; a card passage; a foreign material removal opening which is situated in the card passage; and a foreign material removal passage which is connected to the foreign material removal opening, and which is sloped away from the card passage as moving toward the card insertion slot.

(7) In the seventh card reader of the invention, the foreign material removal passage is situated in a member which is used for forming the card passage.

(8) In the eighth card reader of the invention, a foreign material removal groove is situated in at least one of sides of the card passage or in a bottom face of the card passage.

(9) In the ninth card reader of the invention, the foreign material removal opening is situated in part of the foreign material removal groove.

(10) In the tenth card reader of the invention, an exit of the foreign material removal passage is situated in a front face portion of the card reader.

(11) In the method of installing a card reader of the invention, a card reader according to any one of the above-mentioned card readers is installed while an end of the card passage on the side of the insertion slot is higher than another end of the card passage, and an end of the foreign material removal passage on the side of the insertion slot is lower than another end of the foreign material removal passage.

DETAILED DESCRIPTION OF THE PREFERRED EMBODIMENTS (1) According to the above-described configuration, in the first card reader, external invasion of water and dust into a portion of the magnetic head is prevented from occurring by the invasion preventing means. Thus, invasion of a foreign material into the card reader -main unit can be most effectively prevented.

(2) In the second card reader of the invention, the magnetic head can be swingably held while invasion of a foreign material is prevented, and the card can be surely read.

(3) In the third card reader of the invention, the movement of the magnetic head can be facilitated, and invasion of a foreign material can be surely prevented.

(4) In the fourth card reader of the invention, the magnetic head can be swingably held while invasion of the foreign material is prevented, and the card can be surely read.

(5) In the fifth card reader of the invention, the breakdown of electric insulation due to invasion of foreign materials can be prevented without increasing the number of components.

(Embodiment 1)

Hereinafter an embodiment of the invention will be described with reference to the drawings.

Figure 15:
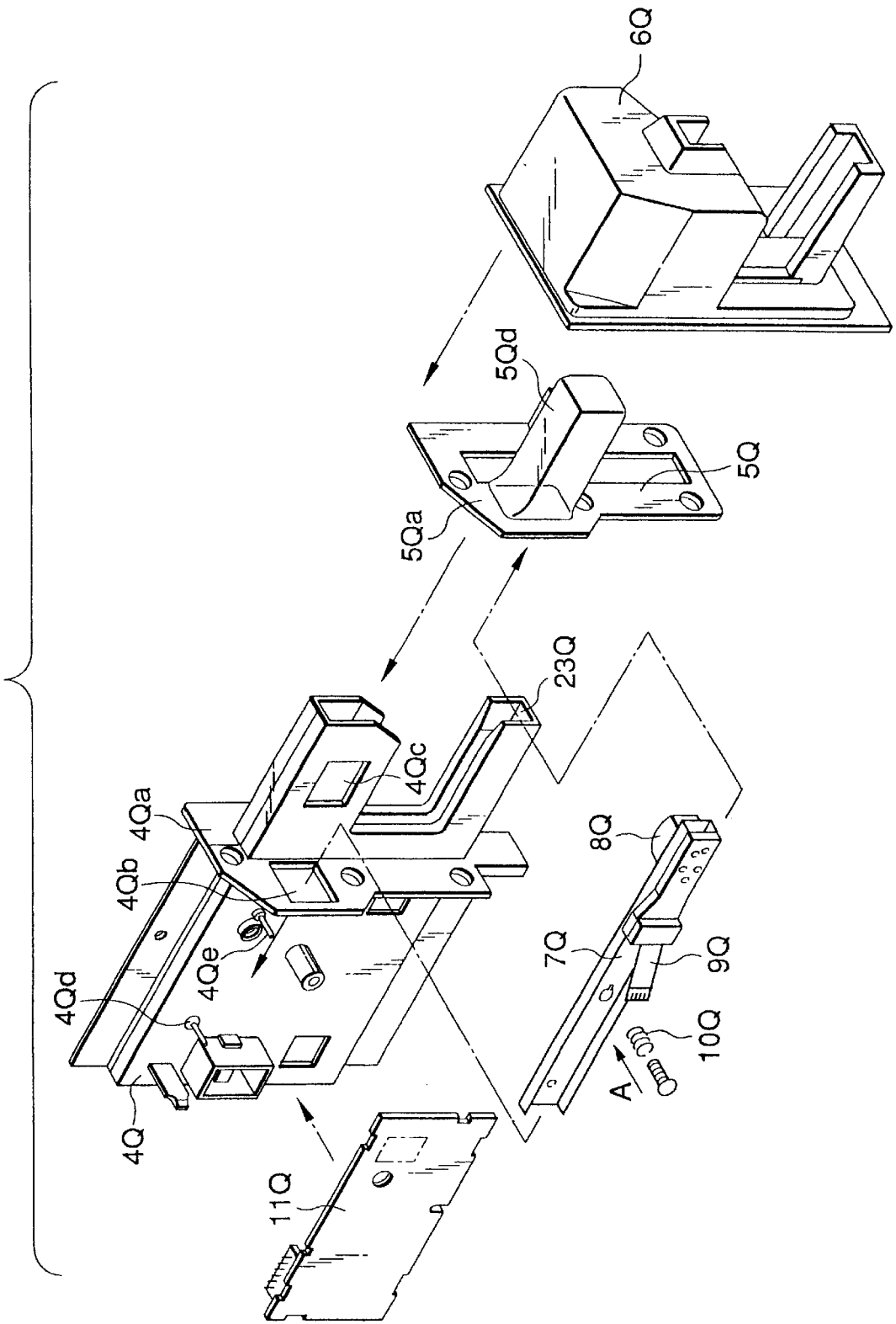
FIG. 15 is a view illustrating the configuration of a card reader according to an embodiment of the invention.

A card reader according to an embodiment of the present invention is configured as shown in FIG. 15. A card reader insertion slot cover 6Q having a card insertion slot into which a card is to be inserted is situated on a card reader main unit 4Q. A circuit unit 11Q for processing information of the card is mounted on the upper face of the card reader main unit 4Q, which is behind the insertion slot cover. A partition wall 4Qa for preventing a foreign material from invading the circuit unit 11Q is situated in the card reader main unit 4Q. Magnetic head holding means 7Q protrudes from the card reader main unit 4Q to the inside of the card reader insertion slot cover 6Q through the partition wall 4Qa. A magnetic head BQ for reading information is situated on the magnetic head holding means 7Q. A card passage 23Q is formed in the card reader main unit.

The thus configured card reader is installed on a usual operation panel (not shown) of an electric apparatus or the like in such a manner that the card reader is downward sloped by about 10 degrees with respect to the level face. According to this installation, foreign material that enters the card passage 23Q of the card reader main unit 4Q is discharged to the outside through the card passage 23Q. In a case where the card reader is installed on an operation panel or the like in such a manner that the card reader is upward sloped with respect to the level face, a drain outlet is situated in a deepest portion of the card passage 23Q, and a drain gutter or a hose is connected to the drain outlet. A drain outlet of the drain gutter or the hose is positioned in a place other than that where the card reader is installed, so as to discharge the foreign material.

Such a card reader is often installed outdoors. In a case where the card reader is used in a place of severe weather conditions, the following problems arise.

Invasion preventing means (a gasket 5Q) for foreign materials is attached to a portion where the card reader main unit 4Q is connected to the card reader insertion slot cover 6Q, so that a foreign material is prevented from entering the circuit unit 11Q situated in the card reader main unit 4Q.

However, the card reader is attached to the operation panel in a downward sloped manner, and therefore water, mud, dust, and the like entering the card passage 23Q of the card reader main unit 4Q are discharged to the outside by means of the slope of the card passage 23Q. This produces problems in that such foreign materials may disadvantageously be exposed to outside air while they move through the card passage 23Q, so that they are cooled and solidified, or the water may be dried, and a foreign material (solid material) adheres or accumulates.

As a specific example, in cold climates, a heater is usually attached on a base side of the card reader main unit (the side opposite to the circuit mounting portion) so that the card reader main unit 4Q and the vicinities thereof are not frozen. Since the card reader main unit 4Q is warmed, foreign material (especially water) that enters the inside of the card reader is not frozen and may be discharged to the outside. During the discharge process, however, the foreign material is exposed to the cold air in the vicinity of the entrance of the card passage, and the foreign material is frozen. In some cases, therefore, a card cannot be inserted.

As described above, there is a problem in that, at the insertion or ejection of a card, the solidified or accumulated foreign materials obstruct the running of the card, and, if the card is not smoothly moved, the card data cannot be properly read.

In a card reader which has no drain outlet in part (in the deepest portion) of the card passage, in order to discharge a foreign material which enters through the card passage 23Q, it is necessary to install the card reader on an operation panel in a downward sloped manner.

A card reader which is installed on the operation panel so that it is upward sloped with respect to the level face involves the following problem. A drain outlet must be situated in the deepest portion of the card passage 23Q and a drain gutter, a drain hose, or the like must be attached to the drain outlet. The connection of the gutter or hose produces problems in that it requires a high cost, and that it is necessary to prepare a space-for attaching them.

Figure 1:
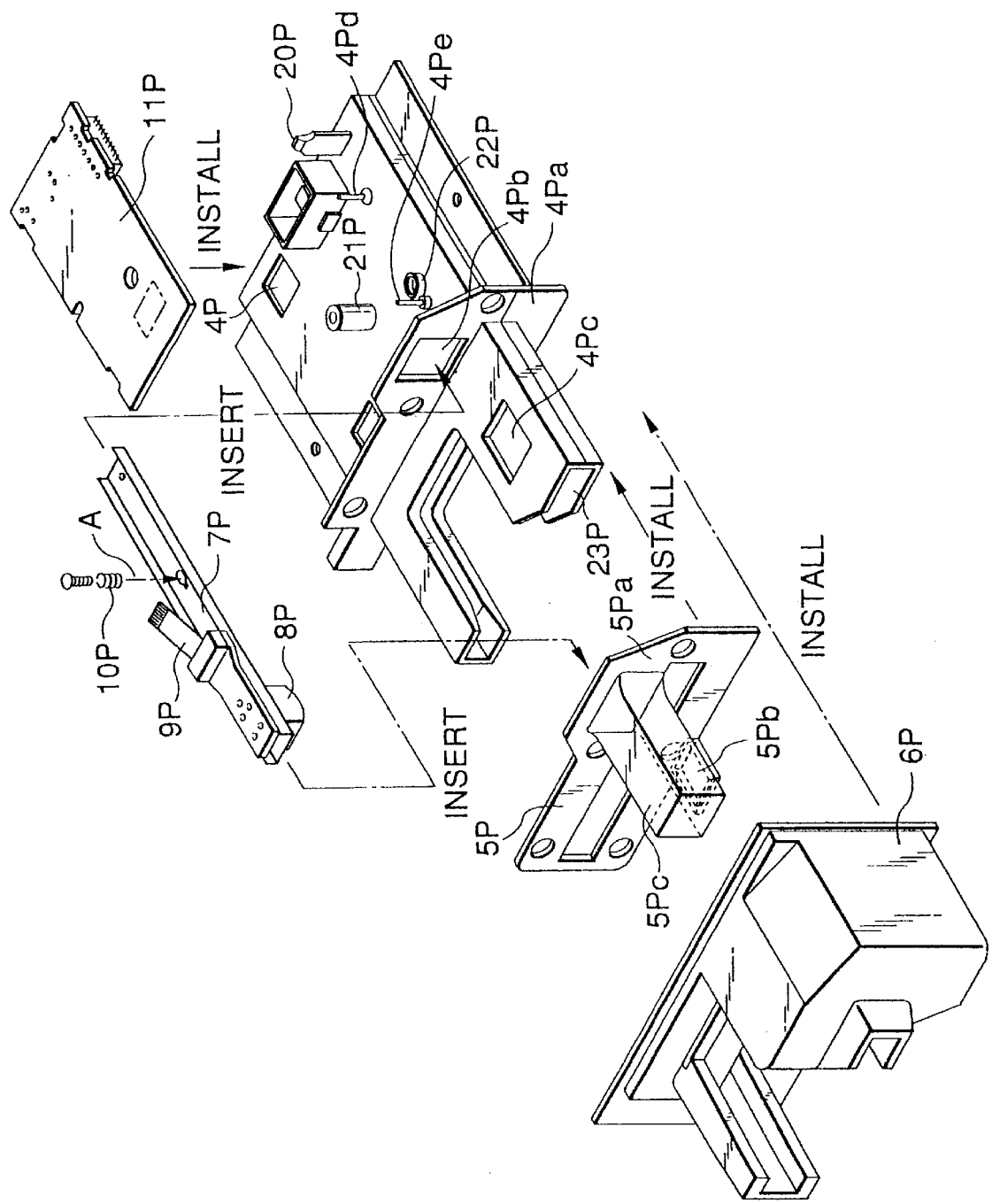
FIG. 1 is a view illustrating the configuration of a card reader of an embodiment of the invention.
Figure 2:
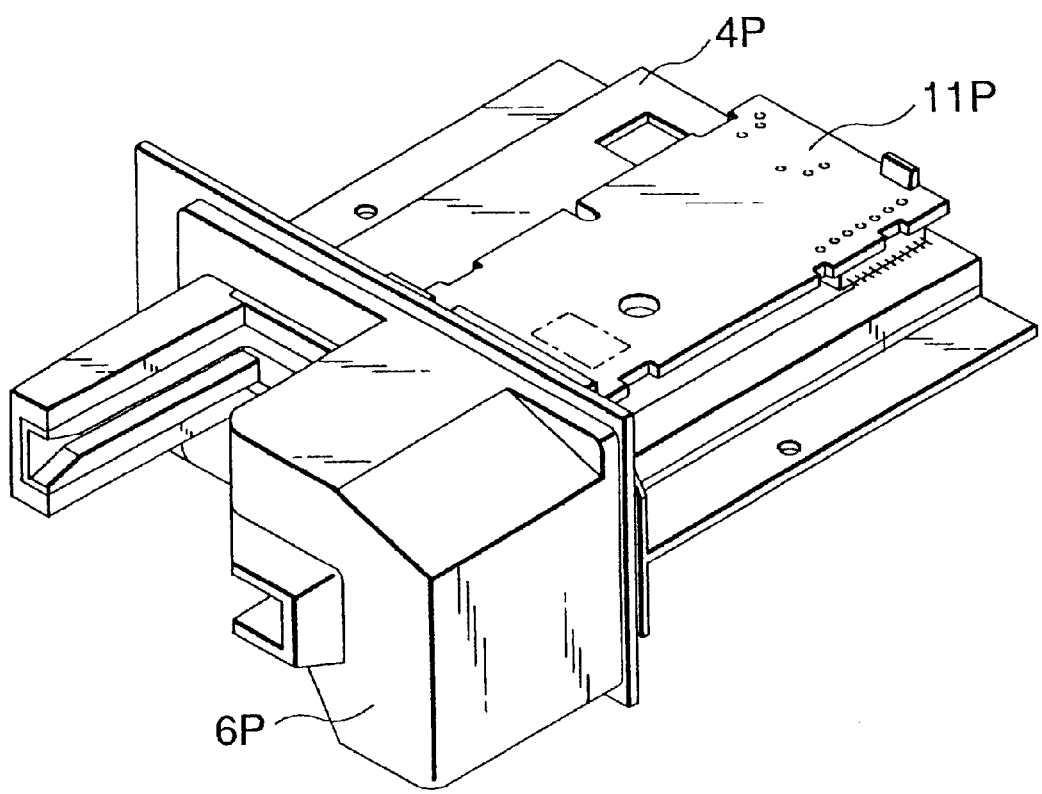
FIG. 2 is a view showing a state in which the card reader is assembled.
Figure 3:
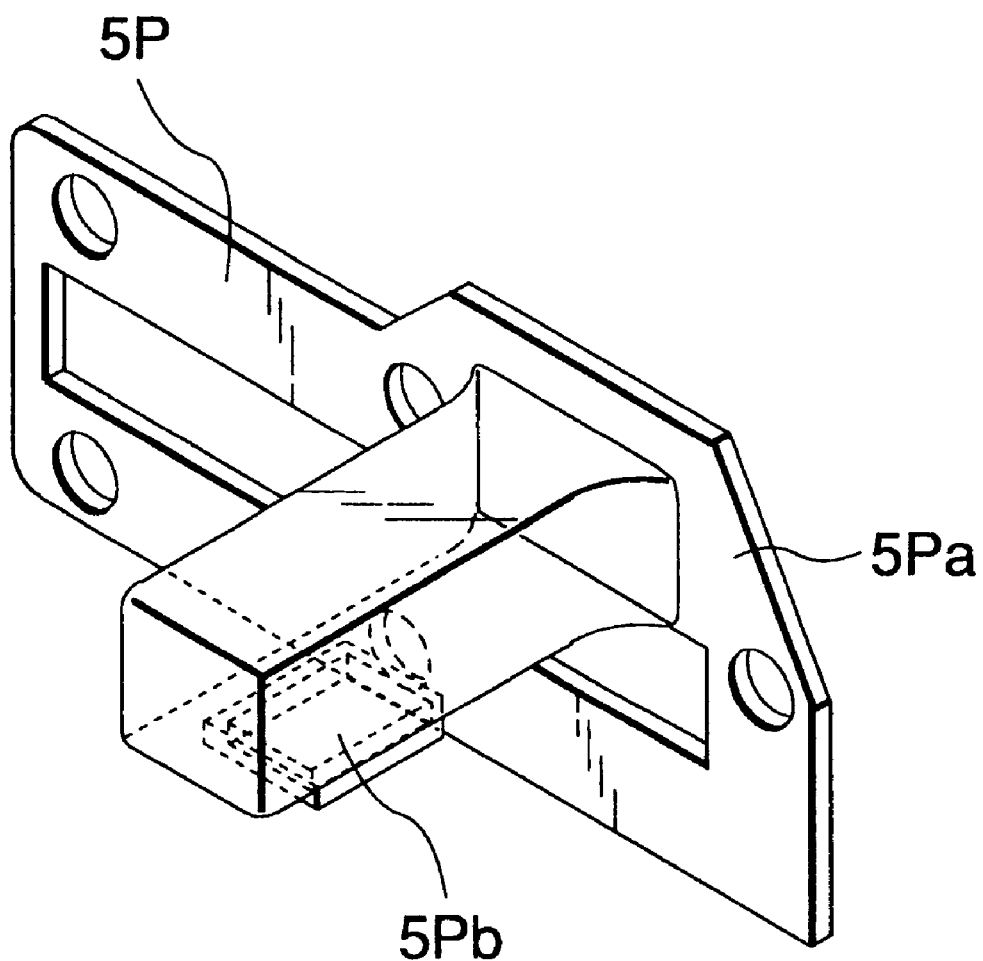
FIG. 3 is a view illustrating a gasket used in the card reader.
Figure 4:
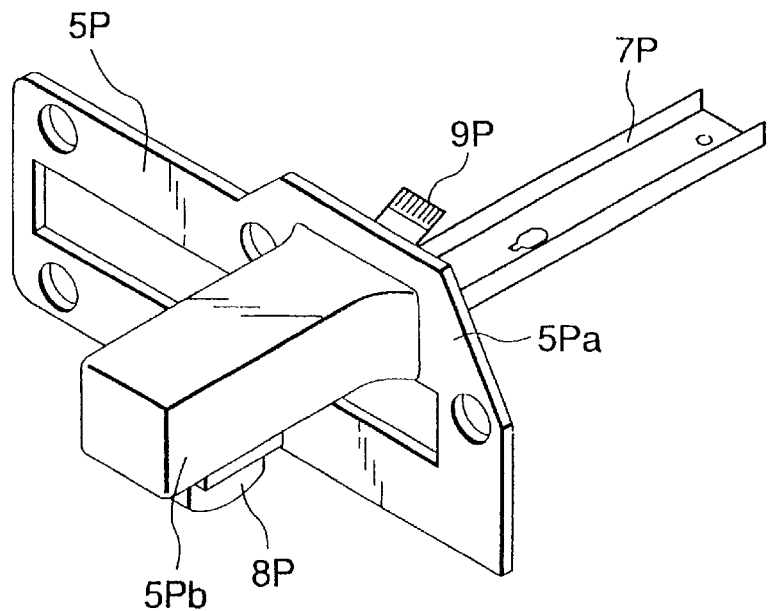
FIG. 4 is a view showing a state in which the gasket and a magnetic head are combined.
Figure 5:
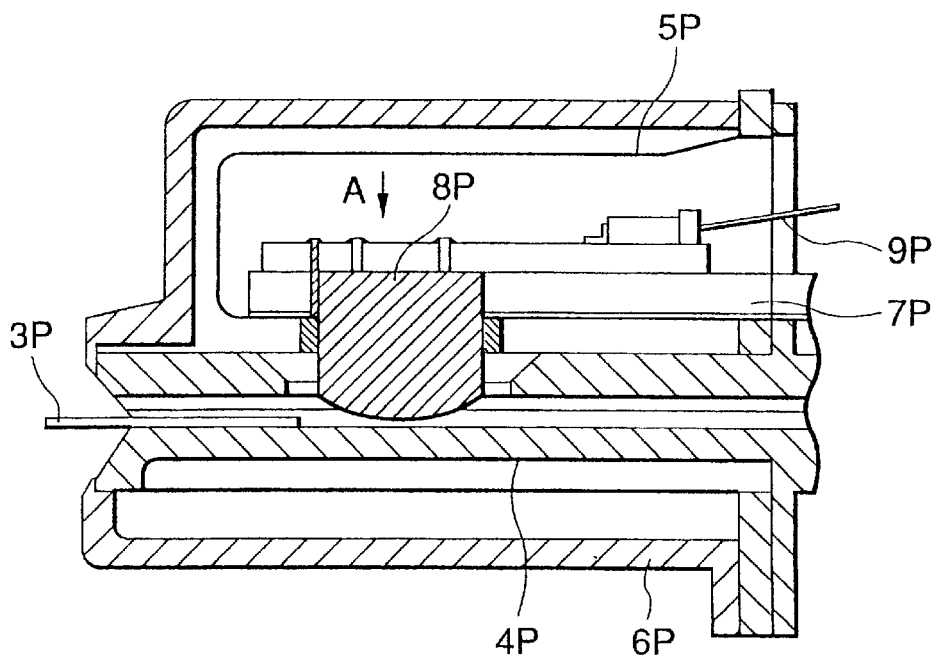
FIG. 5 is a section view of an insertion slot cover unit of the card reader.
Figure 10:
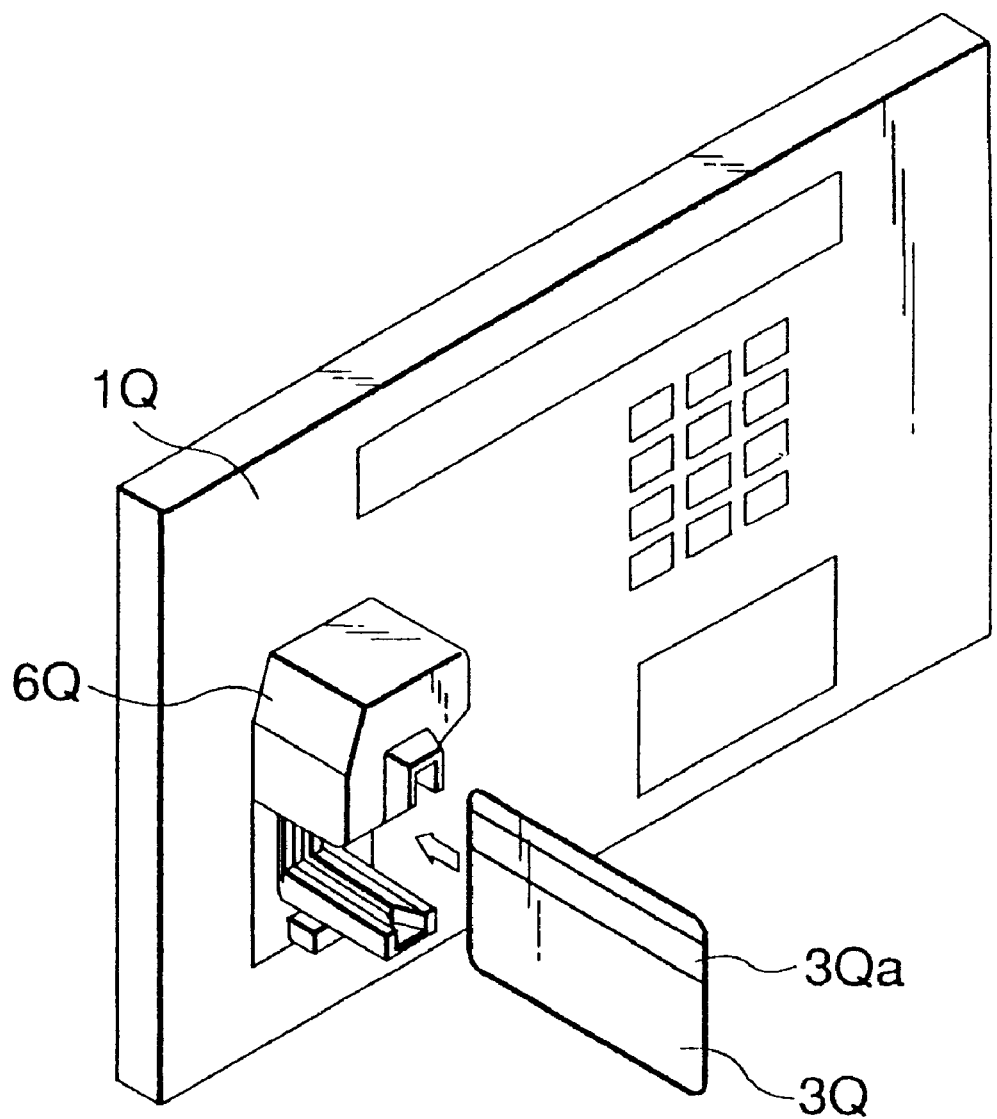
FIG. 10 is a view showing an operation panel which uses the card reader.

FIG. 1 is a view illustrating the configuration of a card reader of a further embodiment of the invention, FIG. 2 is a view showing a state in which the card reader is assembled, FIG. 10 is a view showing an operation panel using the card reader, FIG. 3 is a view illustrating a gasket used in the card reader, FIG. 4 is a view showing a state in which the gasket is combined with a magnetic head, and FIG. 5 is a section view of an insertion slot cover unit-of the card reader.

Referring to FIG. 1, a card reader 2P is configured by a card reader main unit 4P, a gasket 5P serving as the invasion preventing means, an insertion slot cover 6P, magnetic head holding means 7P, a magnetic head 8P, a lead wire 9P, a coil spring (a spring for applying a pressure to the magnetic head) lOP, and a circuit unit 11P.

In the configuration, the card reader main unit 4P is made of a transparent plastic. In the card reader main unit, a space (a card passage 23P) into which a card is to be inserted is formed. The outer portion of the card reader main unit 4P includes a hook 20P for attaching the circuit unit 11P, a screwing boss 21P, a screw hole 22P for attaching the magnetic head holding means 7P by using the coil spring 10P, and a partition wall 4Pa for attaching the insertion slot cover 6P. The partition wall 4Pa has an opening 4Pb through which the magnetic head holding means 7P is inserted. An opening 4Pc through which the magnetic head 8P is pressingly contacted with a magnetic stripe 3Qa bearing information of the card 3Q is formed in a tip end portion of the card reader main unit 4P on the card insertion side.

The gasket 5P is made of an elastic member such as rubber and protrudes from a partition wall attaching face 5Pa toward the card entrance so as to cover the magnetic head holding means 7P. An opening 5Pb for allowing the magnetic head 8P which reads the card data to protrude to the outside of the gasket 5P is formed in a protrusion 5Pc of the gasket 5P. A protrusion of the partition wall portion has a thickness of 0.2 mm. The thickness around the opening 5Pb for the head at a tip end is 2 mm because close contact with the magnetic head 8P must be attained.

The insertion slot cover 6P protects the magnetic head holding means 7P, the magnetic head 8P, the gasket 5P, and the like. The insertion slot cover 6P is fitted onto the card reader main unit 4P so as to clamp and fix the gasket 5P in cooperation with the partition wall 4Pa.

The magnetic head holding means 7P is made of a metal or a plastic having good thermal conductivity. The magnetic head 8P is joined to the tip end of the magnetic head holding means. The magnetic head holding means 7P is attached to the card reader main unit 4P by passing two pins 4Pd and 4Pe through the means and the center portion of the means is then screwed to the main unit via the coil spring 10P or another elastic member. The magnetic head 8P joined to the magnetic head holding means 7P is connected via the lead wire 9P to the circuit unit 11P which is attached to the rear portion of the card reader main unit 4P.

When the components shown in FIG. 1 are assembled, the card reader shown in FIG. 2 is obtained. The card reader shown in FIG. 2 is incorporated in another product. FIG. 10 shows an example of such incorporation. Specifically, FIG. 10 shows a state in which the card reader 2P is installed in an operation panel 1P of a vending machine in a gas station or the like which is generally used. When the card 3Q is inserted or ejected, the card reader 2P reads information recorded on the magnetic stripe 3Qa.

FIG. 4 shows a state in which the magnetic head 8P is inserted into the gasket 5P.

The operation of the configuration will be described. When the card 3Q is inserted into the inside of the card reader main unit 4P through the insertion slot cover 6P of the card reader 2P, the card data is read by the magnetic head 8P situated on the card insertion slot side of the card reader main unit 4P. The magnetic head 8P joined to the magnetic head holding means 7P is urged by the coil spring 10P in a direction indicated by the arrow A in FIG. 1. The magnetic head 8P slides over the card with being closely contacted with the card and swingable about the pin 4Pd situated on the card reader main unit 4P. The protrusion 5Pc of the gasket 5P which is in close contact with the partition wall attaching face 5Pa of the partition wall is configured so that the portion other than that around the opening 5Pb for the magnetic head has a reduced thickness. Therefore, the gasket 5P can easily follow the movement of the magnetic head 8P so as to move or contract. In cold climates, a heater is usually attached to the installation face of the card reader so that portions around the card reader main unit 4P are not frozen. Even in the case where the outside air is so cold that water, gasoline, or the like entering the magnetic head mechanism portion including the magnetic head holding means 7P and the lead wire 9P freezes, warm air or heat in the apparatus circulates and moves to the tip end of the magnetic head holding means 7P because the gasket 5P protrudes. Accordingly, it is possible to eliminate the disadvantage that the lead wire 9P in the gasket 5P is hardened due to the cold and the hardened lead wire 9P obstructs the movement of the magnetic head BP.

In this way, perfect electric insulation of the circuit system including the magnetic head 8P can be ensured. Thus, waterproof and dust-proof can be attained around the magnetic head BP in addition to the circuit unit 11P. Even when a foreign material enters from the outside, therefore, the operation of reading a card can be properly conducted.

Instead of the above-described configuration, the following configuration may be employed.

Figure 6:
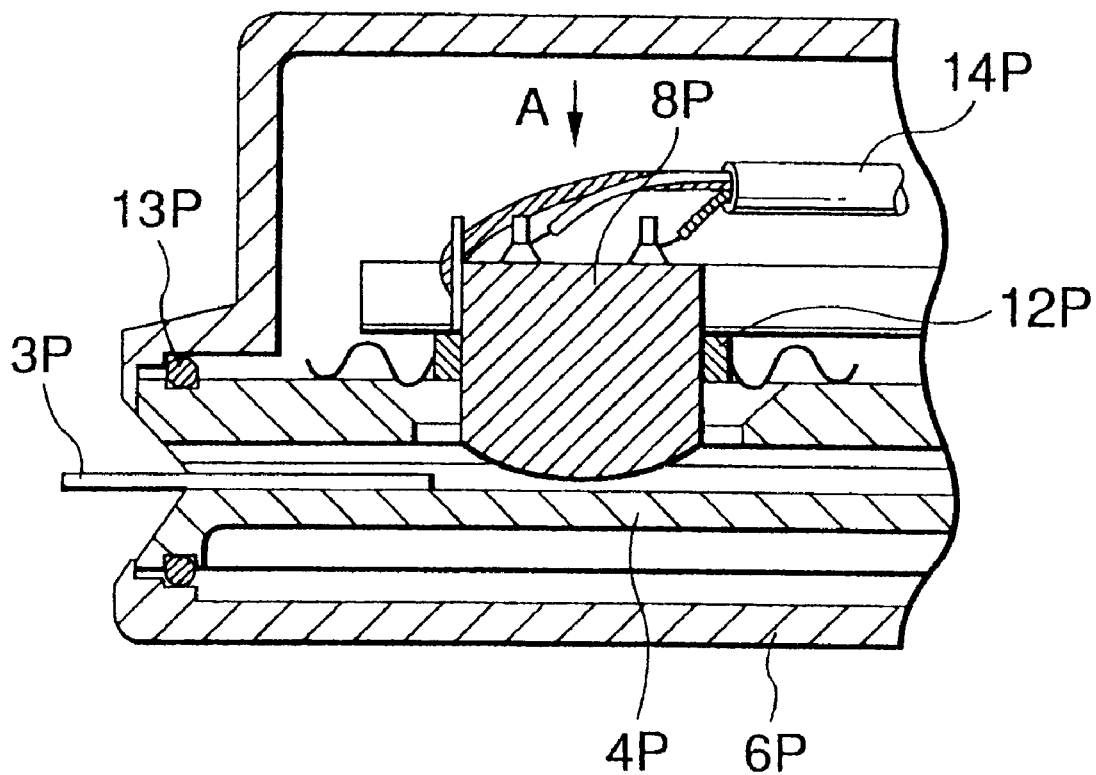
FIG. 6 is a section view of an insertion slot cover of a card reader of another embodiment of the invention.

FIG. 6 is a section view of an insertion slot cover unit of a card reader of another embodiment of the invention. Invasion preventing means 12P is in close contact with the periphery of the magnetic head 8P. The outer peripheral portion is formed so as to have a corrugated flange shape, thereby allowing the outer peripheral portion to be in close contact with the card reader main unit 4P. The insertion slot cover 6P is in close contact with the card reader main unit 4P via an O-ring 13P or a sealing agent. The reference numeral 14P designates a lead wire.

According to this configuration, the same effects as described above can be attained.

From the viewpoint of electric insulation of the circuit system including the magnetic head 8P, a waterproof coating material or a sealing agent may be applied to the soldering portion of the magnetic head 8P and the lead wire, although the application requires processes of sealing agent application, dry, inspection, and the like.

For convenience of description, in FIGS. 1 and 3, the protrusion 5Pc is shown in a transparent state.

As apparent from the above description, in the first card reader, external invasion of water and dust into a portion of the magnetic head is prevented from occurring by the invasion preventing means. Thus, invasion of a foreign material into the card reader main unit can be most effectively prevented.

In the second card reader of the invention, the magnetic head can be swingably held while invasion of a foreign material is prevented, and the card can be surely read.

In the third card reader of the invention, the movement of the magnetic head can be facilitated, and invasion of a foreign material can be surely prevented.

In the fourth card reader of the invention, the magnetic head can be swingably held while invasion of the foreign material is prevented, and the card can be surely read.

In the fifth card reader of the invention, the breakdown of electric insulation due to invasion of foreign materials can be prevented without increasing the number of components.

(6) According to the above-described configuration, in the sixth card reader of the invention, when the foreign material removal passage is situated in a level lower than the card passage, a foreign material can be easily removed from the foreign material removal opening through the foreign material removal passage.

(7) In the seventh card reader of the invention, the foreign material removal passage is situated in a member which is used for forming the card passage. Thus, the card reader can be replaced with a conventional card reader while attaining the same effects as those of the sixth card reader.

(8) In the eighth card reader of the invention, the foreign material removal groove is situated, so that a foreign material can be removed to the foreign material removal groove when a card is inserted or ejected.

(9) In the ninth card reader of the invention, since the foreign material removal opening is situated in part of the foreign material removal groove, foreign materials are prevented from accumulating in the foreign material removal groove. Therefore, the foreign material removal effect can be permanently maintained.

(10) In the tenth card reader of the invention, since the exit of the foreign material removal passage is situated in the card reader insertion slot cover, it is unnecessary to provide any extra foreign material removal passage. Thus, the foreign material removal effect can be attained by a simple configuration.

(11) According to the method of installing a card reader of the invention, a foreign material which enters the card passage can be easily discharged through the foreign material removal passage.

(Embodiment 2)

Hereinafter, a sixth embodiment of the invention will be described with reference to the drawings.

Figure 8:
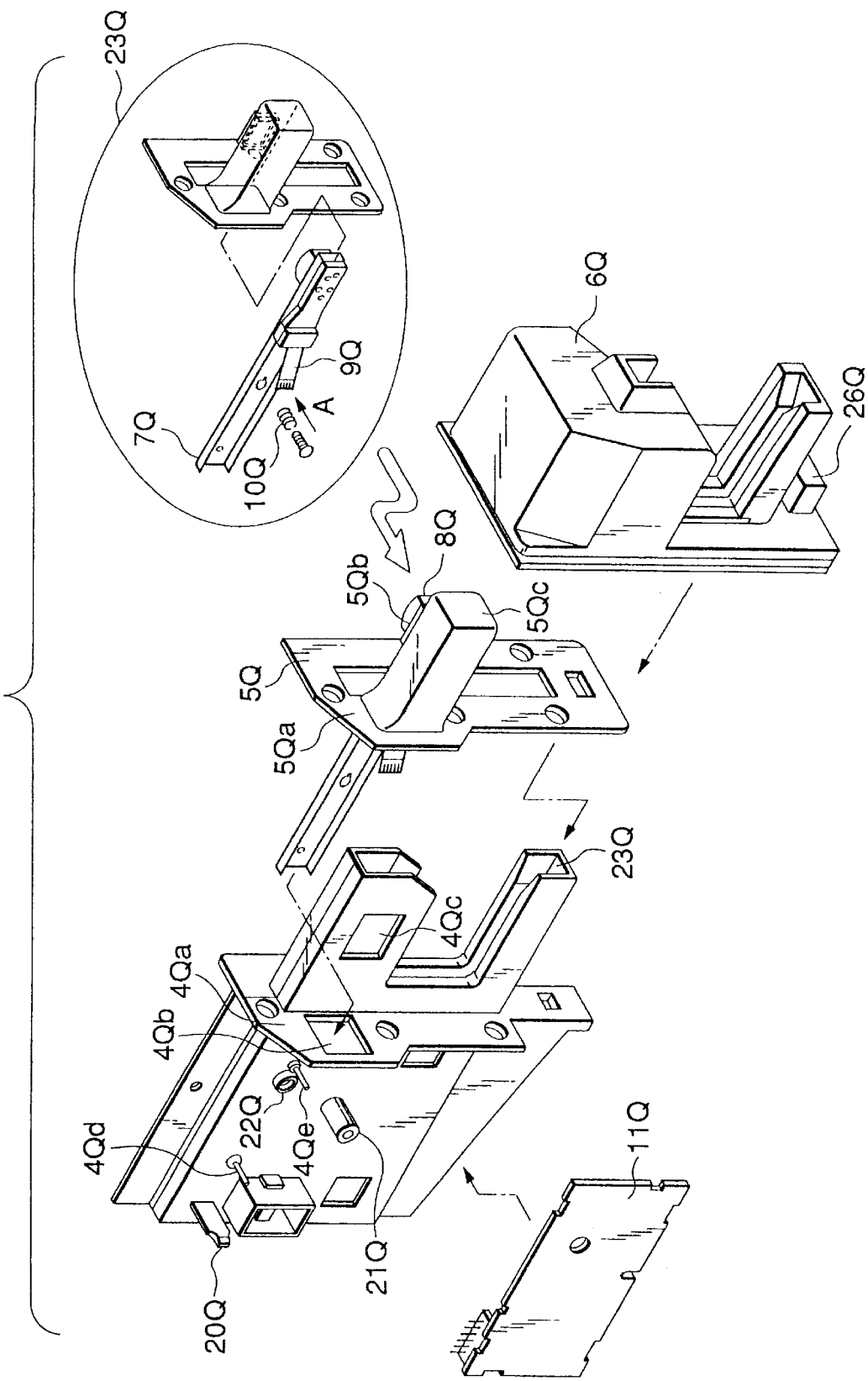
FIG. 8 is a view illustrating the configuration of the card reader of the sixth embodiment of the invention.

FIG. 8 is a view illustrating the configuration of a card reader of theسixth embodiment of the invention.

Referring to FIG. 8, the card reader 2Q is configured by a card reader main unit 4Q, a gasket 5Q, a card reader insertion slot cover 6Q having a card insertion slot, magnetic head holding means 7Q, a magnetic head 8Q, a lead wire 9Q, a coil spring (a spring for applying a pressure to the magnetic head) 10Q, and a circuit unit 11Q.

In the configuration, the card reader main unit 4Q is made of a transparent plastic. In the card reader main unit, a space (a card passage 23Q) into which a card is to be inserted, and a drain outlet 24Q and a drain pipe 25Q which are used for removing a foreign material are formed. The outer portion of the card reader main unit 4Q includes a hook 20Q for attaching the circuit unit 11Q, a screwing boss 21Q, a screw hole 22Q for attaching the magnetic head holding means 7Q by using the coil spring 10Q, and a partition wall 4Qa to which the card reader insertion slot cover 6Q is attached. The partition wall 4Qa has an opening 4Qb into which the magnetic head holding means 7Q is inserted. An opening 4Qc through which the magnetic head 8Q is pressingly contacted with a magnetic stripe 3Qa bearing information of the card 3Q is formed in a tip end portion of the card reader main unit 4Q on the card insertion side.

The gasket 5Q is made of an elastic member such as rubber and protrudes from a partition wall attaching face 5Qa toward the card entrance so as to cover the magnetic head holding means 7Q. An opening 5Qb for allowing the magnetic head 8Q which reads the card data to protrude to the outside of the gasket 5Q is formed in a protrusion 5Qc of the gasket 5Q. In FIG. 8, a portion enclosed by a circle illustrates the manner of the attachment of the gasket 5Q to the magnetic head 8Q. In the figure, for convenience of description, the protrusion 5Qc is shown in a transparent state.

The card reader insertion slot cover 6Q protects the magnetic head holding means 7Q, the magnetic head 8Q, the gasket 5Q, and the like. The card reader insertion slot cover is fitted onto the card reader main unit 4Q so as to clamp and fix the gasket 5Q in cooperation with the partition wall 4Qa.

The magnetic head holding means 7Q is made of a metal or a plastic having good thermal conductivity. The magnetic head 8Q is joined to the tip end of the magnetic head holding means. The magnetic head holding means 7Q is attached to the card reader main unit 4Q by passing two pins 4Qd and 4Qe through the means and the center portion of the means is then screwed to the main unit via the coil spring 10Q or another elastic member. The magnetic head 8Q joined to the magnetic head holding means 7Q is connected via the lead wire 9Q to the circuit unit 11Q which is attached to the rear portion of the card reader main unit 4Q.

Figure 7A:
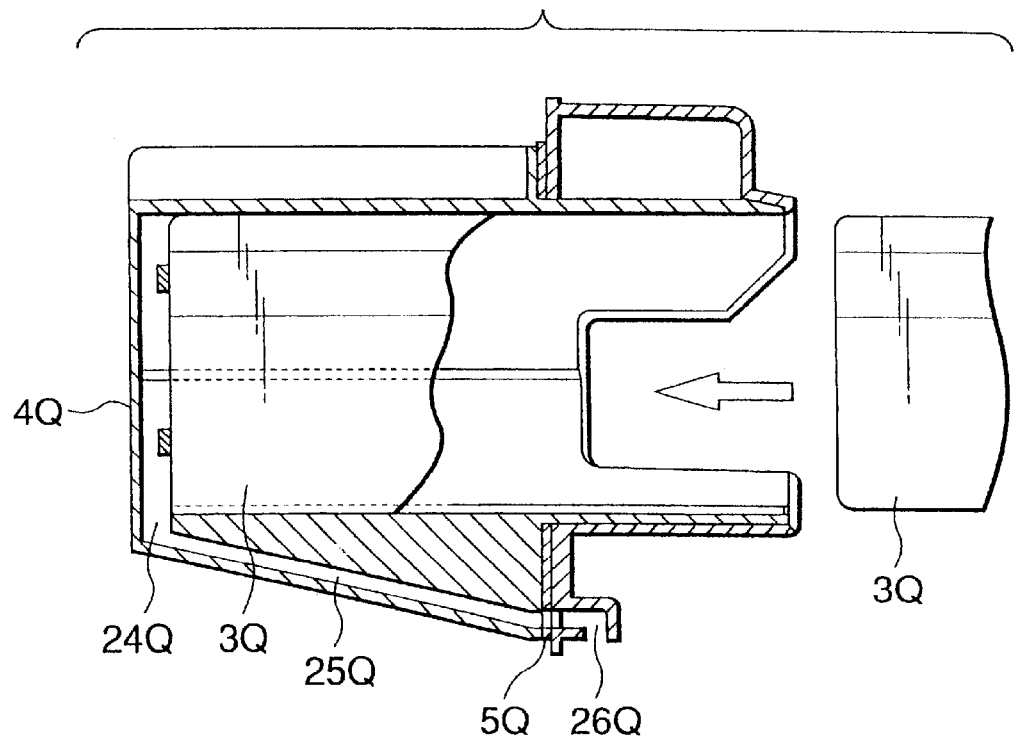
FIG. 7A is a section view showing the configuration of a card reader of the sixth embodiment of the invention.
Figure 7B:
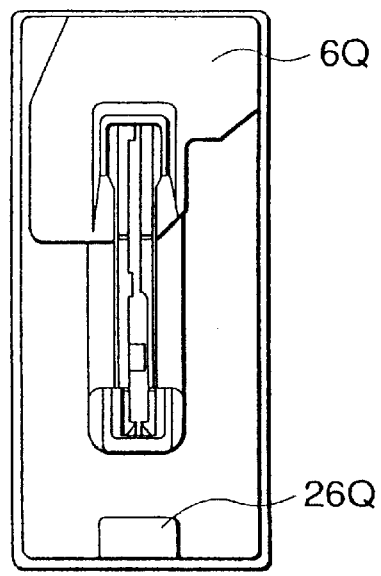
FIG. 7B is a front view of the card reader.

FIG. 7A is a section view of a card passage unit of the card reader of the sixth embodiment of the invention, and FIG. 7B is a front view of the card passage unit. The card reader is formed by assembling the components shown in FIG. 8. The drain outlet 24Q, the drain pipe 25Q, and a drain exit 26Q of the card reader insertion slot cover 6Q are situated in the card reader. The reference numeral 3Q designates a part of a card which is to be inserted.

Figure 9:
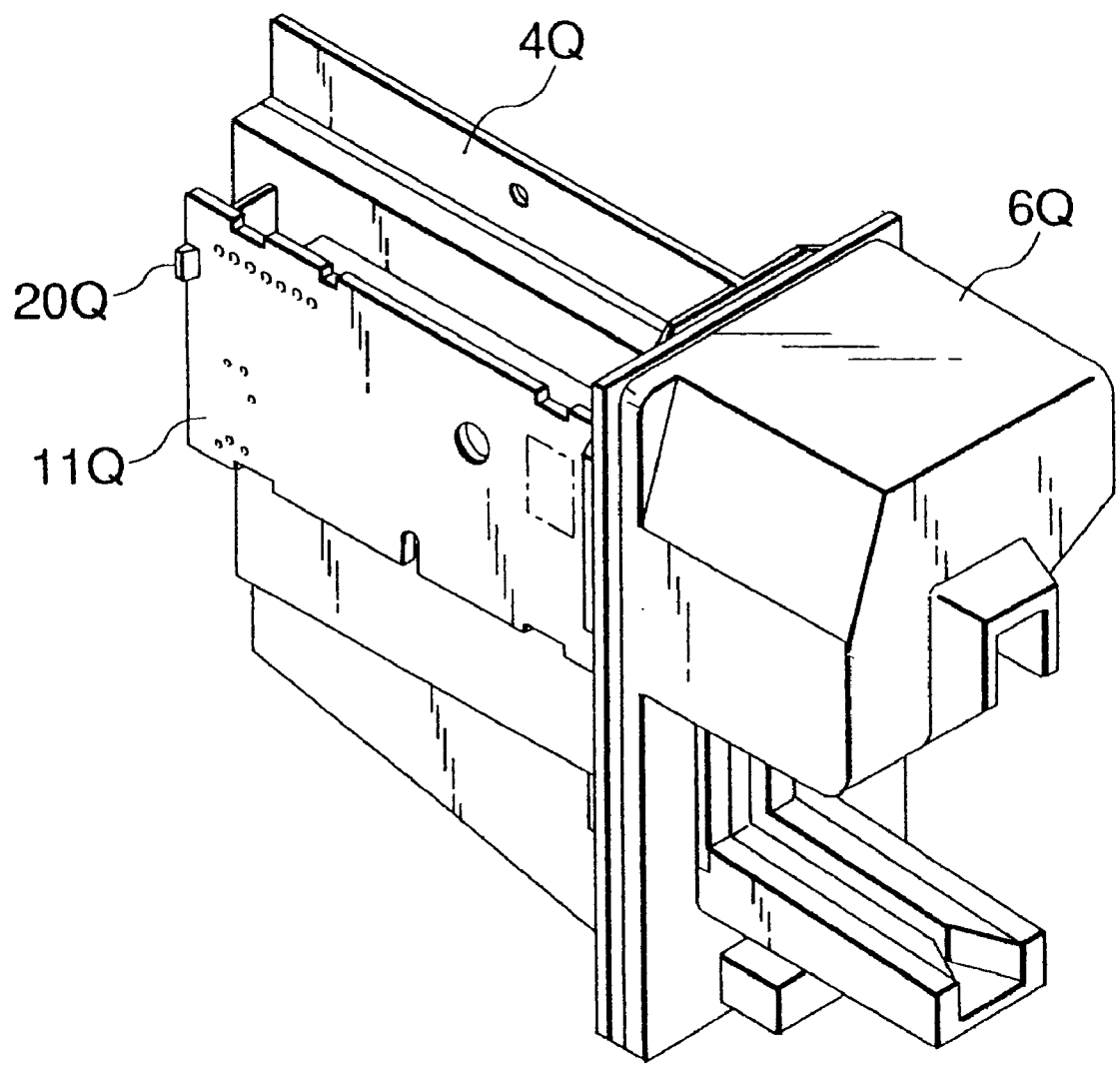
FIG. 9 is a view showing a state in which the card reader is assembled.

FIG. 9 shows an appearance of the card reader formed by assembling the components shown in FIG. 8. The card reader shown in FIG. 9 is incorporated in another product. FIG. 10 shows an example of such incorporation. Specifically, FIG. 10 shows a state in which the card reader 2Q is installed in an operation panel 1Q of a vending machine in a gas station or the like which is generally used. When the card 3Q is inserted or ejected, the card reader 2Q reads information recorded on the magnetic stripe 3Qa.

The operation of the configuration will be described. When the card 3Q is inserted into the inside of the card reader main unit 4Q through the card reader insertion slot cover 6Q of the card reader 2Q, the card data is read by the magnetic head 8Q situated on the card insertion slot side of the card reader main unit 4Q. The magnetic head 8Q joined to the magnetic head holding means 7Q is urged by the coil spring 10Q in a direction indicated by the arrow A (shown in the circle in FIG. 8). The magnetic head 8Q slides over the card with being closely contacted with the card and swingable about the pin 4Qd situated on the card reader main unit 4Q. In order to immediately discharge a foreign material entering the card reader from the card passage 23Q, the drain outlet 24Q is situated. The drain pipe 25Q which is integrated with the card reader main unit 4Q is situated under the drain outlet 24Q.

Figure 11:
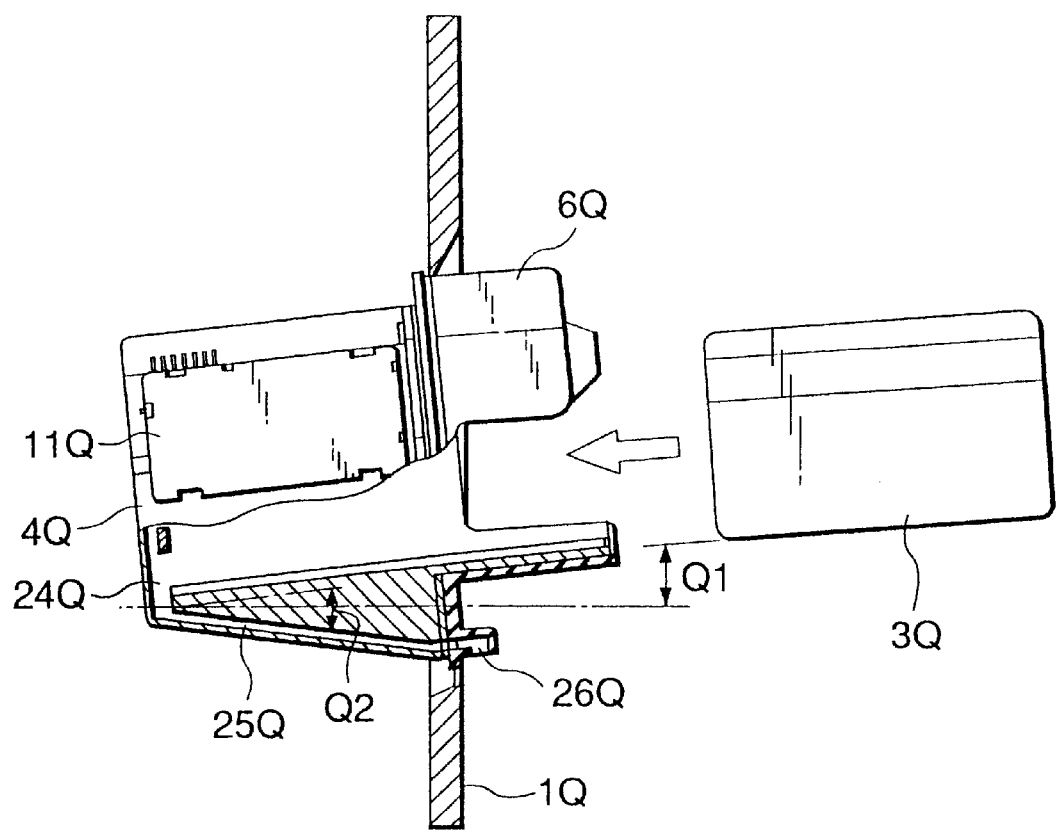
FIG. 11 is a view illustrating a state in which the card reader is installed on the panel with being upward sloped.

FIG. 11 is a view showing a state in which the card reader is installed in an upward sloped manner with respect to the operation panel 1Q. In FIG. 11, the card reader is shown partly in section. As shown in the figure, even when the card reader is installed in an upward sloped manner by an installation angle 01 of the card reader to the operation panel 1Q which is smaller than a tilt angle 02 of the drain pipe of the card reader, a foreign material entering the card passage 23Q is discharged through the drain pipe 25Q to the outside. In other words, the card reader is installed in such a manner that the end of the card passage 23Q on the insertion side is higher than the other end of the card reader, and the end of the drain pipe (the foreign material removal passage) 25Q on the insertion side is lower than the other end of the pipe.

As described above, the card reader of the embodiment comprises: the card reader main unit 4Q having the card passage 23Q; the magnetic head 8Q which is situated in the card reader main unit 4Q and protrudes into the card passage 23Q so as to read the contents recorded on the card 3Q; and the gasket (reception preventing means) 5Q which is in close contact with the periphery of the magnetic head 8Q and prevents foreign materials from entering the card reader main unit 4Q from the outside. The card reader further comprises the drain outlet 24Q in the card passage 23Q of the card reader main unit 4Q, and the drain pipe 25Q connected to the drain outlet 24Q. The drain pipe 25Q is situated in a downward sloped manner toward the card insertion slot (in a direction away from the card passage 23Q). As a result, a foreign material entering the card passage 23Q of the card reader main unit 4Q can be discharged to the outside from the drain outlet 24Q in the deepest portion through the drain pipe 25Q.

According to the card reader of the embodiment, water or dust which enters the card reader main unit 4Q is discharged through the drain pipe 25Q, thereby preventing the water or dust from accumulating in the card passage 23Q. Since the drain pipe 25Q is situated in a downward sloped manner, the card reader can be installed on the operation panel 1Q with being upward sloped. Since a foreign material can be removed by the card reader itself, it is unnecessary to connect an additional drain hose to the card reader or additionally situate a gutter.

(Embodiment 3)

Hereinafter, a seventh embodiment of the invention will be described with reference to the drawings.

Figure 12A:
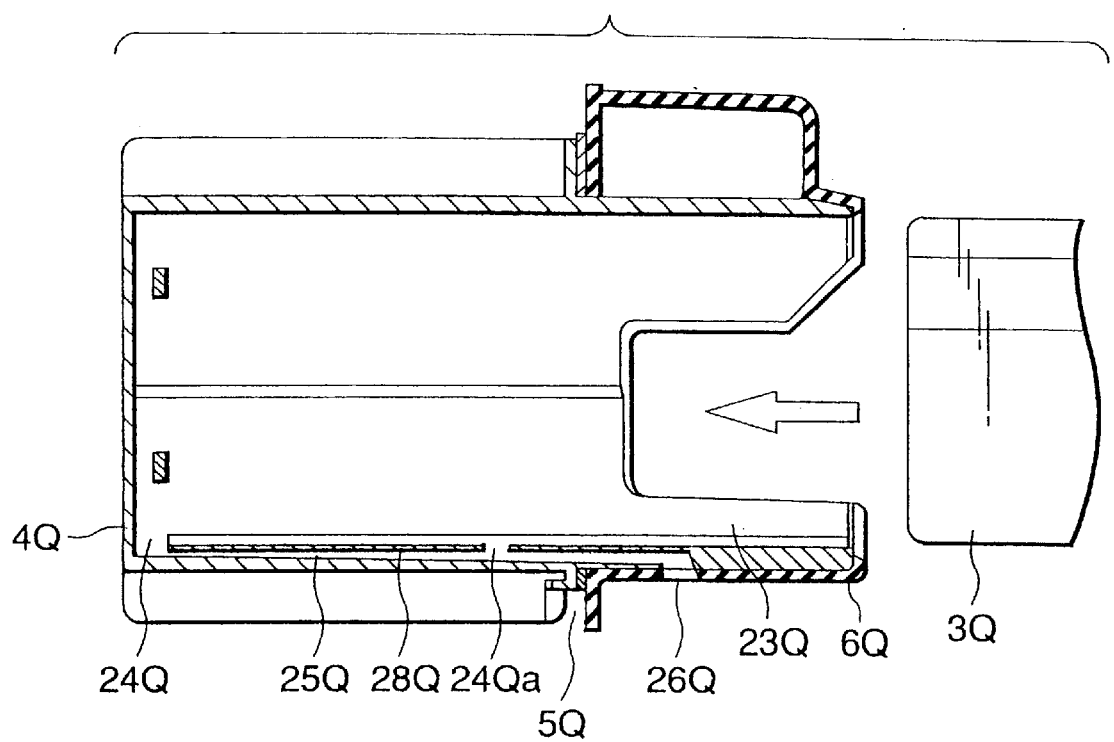
FIG. 12A is a section view showing the structure of a card reader of the seventh embodiment of the invention.
Figure 12B:
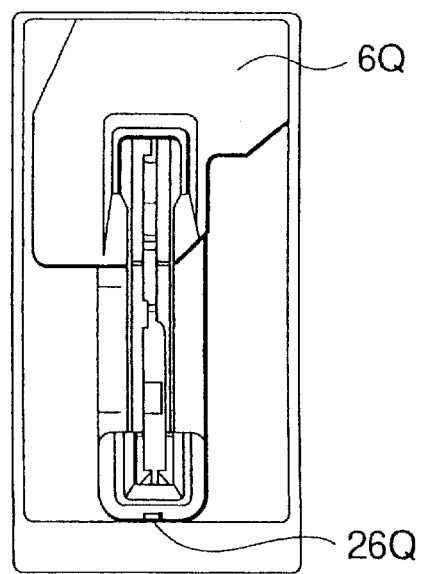
FIG. 12B is a front view of the card reader.

FIG. 12A is a section view showing the structure of a card reader of the seventh embodiment of the invention, and FIG. 12B is a front view of the card reader.

The appearances and components of the embodiment which are the same as those of the sixth embodiment are designated by the same reference numerals and the description thereof is omitted. In the embodiment, in order to discharge a foreign material entering the card reader to the outside, as shown in FIG. 12, the drain pipe 25Q is downward sloped at an angle which is smaller than that of the sixth card reader (FIG. 10) and which is in a range where the tip end of the drain pipe 25Q is accommodated in a lower protrusion of the card reader insertion slot cover 6Q. The drain exit 26Q is situated under the card passage 23Q of the card reader insertion slot cover 6Q.

In the case where the card reader is installed on the operation panel 1Q with being downward sloped, a foreign material may not reach the deepest portion. Thus, one or more drain outlet 24Qa may be situated in the bottom face 28Q of the card passage.

According to the invention, in the card reader of the embodiment, the drain pipe 25Q is situated so as to gradually come closer to the card passage with starting from the drain exit 26Q, and the drain pipe 25Q is downward sloped at an angle in a range where the tip end of the drain pipe 25Q can be accommodated in the lower protrusion of the card reader insertion slot cover 6Q. Therefore, a foreign material which enters the deepest portion of the card passage 23Q or which is carried to the deepest portion by the tip end of a card can be discharged from a lower portion of the card passage 23Q of the card reader insertion slot cover by way of the drain outlet 24Q and the drain pipe 25Q. The card reader insertion slot cover 6Q can be produced so as to have an appearance which is substantially identical with that of a conventional card reader, with the result that the card reader of the embodiment is replaceable with an existent card reader.

(Embodiment 4)

Hereinafter, an eighth embodiment of the invention will be described with reference to the drawings.

Figure 13A:
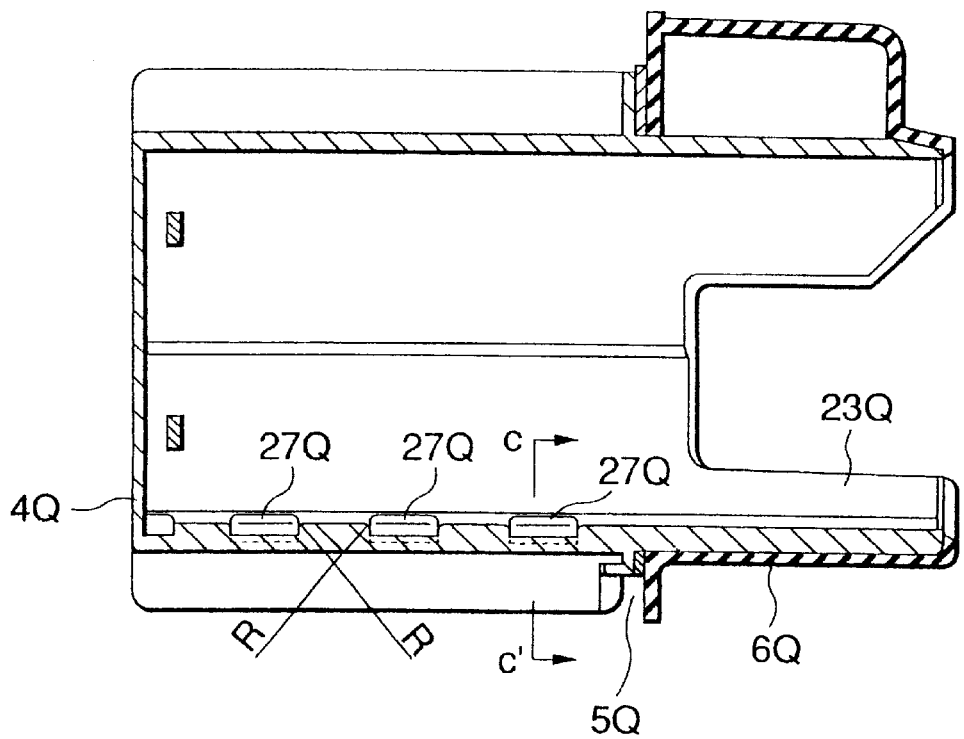
FIG. 13A is a section view showing the structure of a card reader of an eighth embodiment of the invention.
Figure 13B:
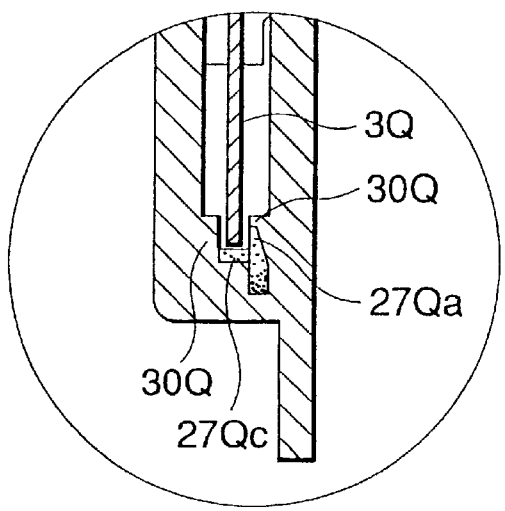
FIG. 13B is a section view of the card reader taken along the line c—c and FIG. 13C is a partial-section view the card reader.
Figure 13C:
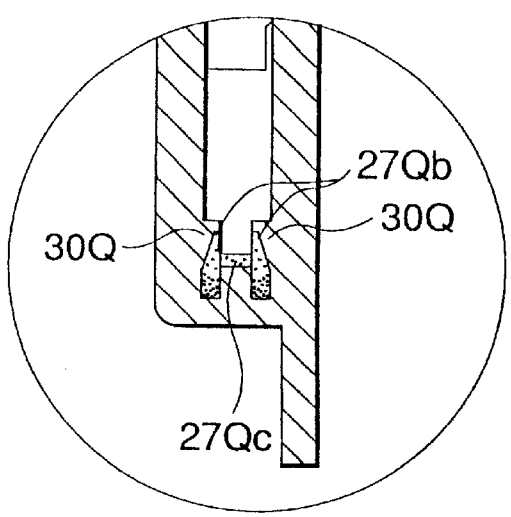

FIG. 13A is a section view showing the structure of a card reader of the eighth embodiment of the invention. In the card reader of the embodiment, in the same manner as a card reader of the prior art, the card passage 23Q functions also as the drain pipe 25Q, and a foreign material is discharged through the card passage 23Q. A foreign material removal groove 27Q (about 0.2 to 1 mm) is situated in the bottom face and both sides of the card passage 23Q. A foreign material which enters the card passage 23Q to adhere thereto is moved away to the foreign material removal groove 27Q in the bottom face or the side faces, while the foreign material is pushingly moved by a card. FIG. 13B shows a section of the card passage taken along the line c—c' and is a section view showing a foreign material removal groove 27Qa situated in one face of the card passage 23Q and a foreign material removal groove 27Qc situated in the bottom face of the card passage 23Q. FIG. 13C is a partial section view showing foreign material removal grooves 27Qb situated in card guide portions 30Q on both sides of the card passage 23Q and a foreign material removal groove 27Qc in the bottom face. Each corner of the foreign material removal groove 27Q is chamfered or rounded so that any physical shock or vibration is not caused by the contact of the card 3Q.

As described above, in the card reader of the embodiment, a plurality of foreign material removal grooves 27Q are situated in at least one of the card guide portions 30Q on both sides of the card passage 23Q of the card reader main unit 4Q. When a cleaning card or a normal card is inserted, a foreign material in the card passage 23Q can be removed to the foreign material removal groove 27Q. Thus, a foreign material can be prevented from adhering to or accumulating in the card passage 23Q, so that stable card running can be attained and the data can be properly read.

(Embodiment 5)

Hereinafter, a ninth embodiment of the invention will be described with reference to the drawings.

Figure 14A:
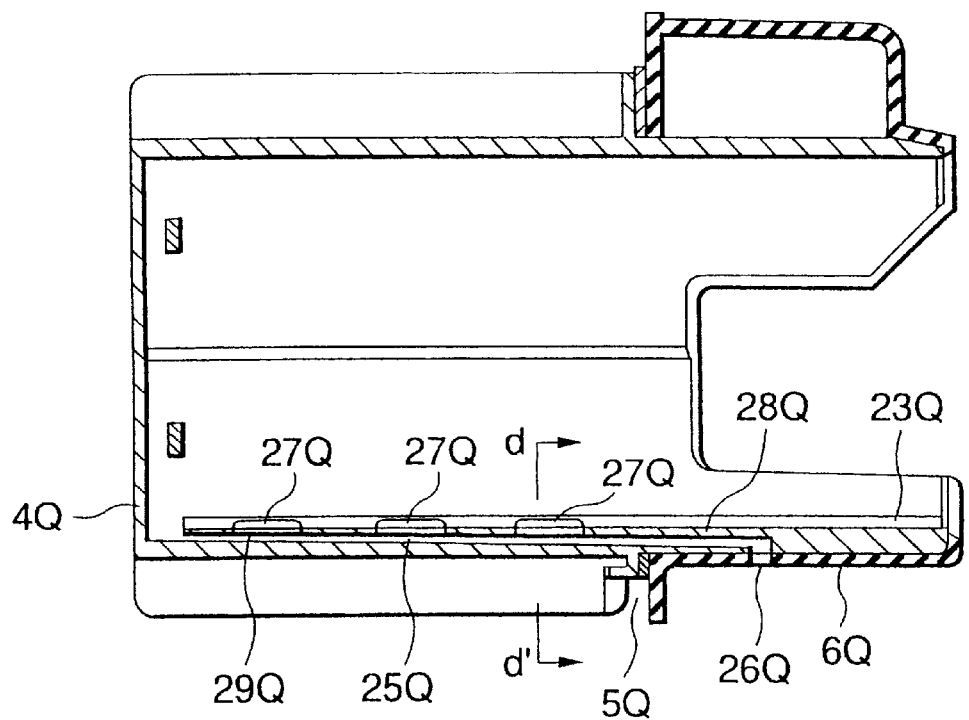
FIG. 14A is a section view showing the structure of a card reader of a ninth embodiment of the invention.
Figure 14B:
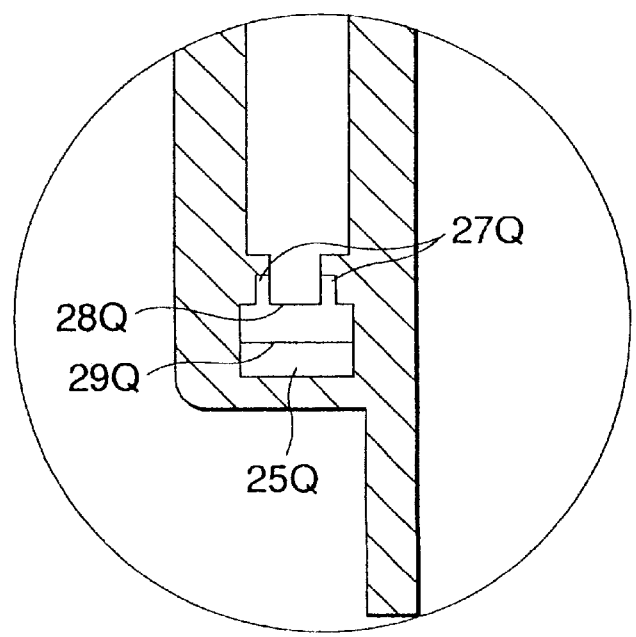
FIG. 14B is a section view the card reader taken along the line d—d.

FIG. 14A is a section view showing the structure of a card reader of the ninth embodiment of the invention, and FIG. 14B is a section view taken along the line d–d'. The appearances and components of the embodiment which are the same as those of the seventh embodiment are designated by the same reference numerals and the description thereof is omitted. In the embodiment, the foreign material removal groove 27Q in the eighth embodiment is situated in the card passage 23Q, and an opening 29Q which elongates from the foreign material removal groove 27Q to the drain pipe 25Q is situated. A foreign material removed to the foreign material removal groove 27Q is discharged to the outside through the sloped drain pipe 25Q by way of the opening 29Q by a water flow or other means.

In this way, in the card reader of the embodiment, the foreign material removal groove 27Q can be prevented from being filled with foreign materials, so that foreign materials do not overflow to the card passage 23Q. Also, foreign materials do not accumulate in the foreign material removal groove 27Q and can be immediately discharged to the outside through the drain pipe 25Q. In addition, when water is poured from a hose into the card insertion slot for the purpose of cleaning, the water smoothly flows from the card reader to the drain pipe 25Q. Thus, mud and dust can be easily washed out.

As apparent from the above description, in the sixth card reader of the invention, when the foreign material removal passage is situated in a lower level than the card passage, a foreign material can be easily removed from the foreign material removal opening through the foreign material removal passage.

In the seventh card reader of the invention, the foreign material removal passage is situated in a member which is used for forming the card passage. Thus, the card reader can be replaced with any conventional card reader while attaining the same effects as those of the sixth card reader.

In the eighth card reader of the invention, the foreign material removal groove is situated, so that a foreign material can be removed to the foreign material removal groove when a card is inserted or ejected.

In the ninth card reader of the invention, since the foreign material removal opening is situated in part of the foreign material removal groove, foreign material are prevented from accumulating in the foreign material removal groove. Therefore, the foreign material removal effect can be permanently maintained.

In the tenth card reader of the invention, since the exit of the foreign material removal passage is situated in the card reader insertion slot cover, it is unnecessary to provide any extra foreign material removal passage. Thus, the foreign material removal effect can be attained by a simple configuration.

According to the method of installing a card reader of the invention, a foreign material which enters the card passage can be easily discharged through the foreign material removal passage.

What is claimed is:

1. A card reader comprising:
    a card insertion slot into which a card is to be inserted;
    a card passage extending rearwardly from said card insertion slot, said card passage having an outer end adjacent said card insertion slot and an inner end remote from said card insertion slot;
    a foreign material removal opening that issues into said card passage at a location spaced rearwardly from said card insertion slot; and
    a foreign material removal passage that has an inlet and an outlet, said inlet being connected to said foreign material removal opening, and wherein, from said inlet toward said outlet, said foreign material removal passage slopes away from said card passage and extends in a direction toward said card insertion slot.

2. The card reader of claim 1, wherein said foreign material removal passage is formed in a member that defines at least a portion of said card passage.

3. The card reader of claim 1, wherein a foreign material removal groove is formed in a side of said card passage, said foreign material removal groove being adapted to receive and retain foreign material therein and thereby help to keep said card passage relatively free of foreign material.

4. The card reader of claim 3, wherein said foreign material removal opening issues into said foreign material removal groove.

5. The card reader of claim 1, further comprising an insertion slot cover that defines said card insertion slot and wherein said outlet of said foreign material removal passage is formed in said insertion slot cover.

6. A method of installing a card reader, said card reader having: a card insertion slot into which a card is to be inserted;
    a card passage extending rearwardly from said card insertion slot, said card passage having an outer end adjacent said card insertion slot and an inner end remote from said card insertion slot;
    a foreign material removal opening that issues into said card passage at a location spaced rearwardly from said card insertion slot; and
    a foreign material removal passage that has an inlet and an outlet, said inlet being connected to said foreign material removal opening, and wherein, from said inlet toward said outlet, said foreign material removal passage slopes away from said card passage and extends in a direction toward said card insertion slot;
    said method comprising the steps of:
        installing said card reader so that the outer end of said card passage is higher than the inner end of said card passage, and so that the outlet of said foreign material removal passage is lower than the inlet of said foreign material removal passage.

7. The card reader of claim 1, wherein a foreign material removal groove is formed in a bottom face of said card passage, said foreign material removal groove being adapted to receive and retain foreign material therein and thereby help to keep said card passage relatively free of foreign material.

8. The card reader of claim 7, wherein said foreign material removal opening issues into said foreign material removal groove.

9. A card reader comprising:
    a card insertion slot into which a card is to be inserted;
    a card passage extending rearwardly from said card insertion slot, said card passage having an outer end adjacent said card insertion slot and an inner end remote from said card insertion slot;
    at least one foreign material removal opening that issues into said card passage at a location that is relatively closer to said inner end of said card passage than to said outer end of said card passage; and
    a foreign material removal passage that has at least one inlet and an outlet, said at least one inlet being connected to said at least one foreign material removal opening, and wherein, from said at least one inlet toward said outlet, said foreign material removal passage slopes away from said card passage and extends in a direction toward said card insertion slot.

10. The card reader of claim 9, wherein said foreign material removal passage is formed in a member defines at least a portion of said card passage.

11. The card reader of claim 9, wherein a foreign material removal groove is formed in a side of said card passage, said foreign material removal groove being adapted to receive and retain foreign material therein and thereby help to keep said card passage relatively free of foreign material.

12. The card reader of claim 11, wherein said at least one foreign material removal opening issues into said foreign material removal groove.

13. The card reader of claim 9, further comprising an insertion slot cover that defines said card insertion slot, and wherein said outlet of said foreign material removal passage is formed in said insertion slot cover.

14. The card reader of claim 9, wherein a foreign material removal groove is formed in a bottom face of said card passage, said foreign material removal groove being adapted to receive and retain foreign material therein and thereby help to keep said card passage relatively free of foreign material.

15. The card reader of claim 14, wherein said at least one foreign material removal opening issues into said foreign material removal groove.

* * * * *

UNITED STATES PATENT AND TRADEMARK OFFICE
CERTIFICATE OF CORRECTION

PATENT NO. : 6,176,426 B1
DATED : January 23, 2001
INVENTOR(S) : Kanayama et al.

It is certified that error appears in the above-identified patent and that said Letters Patent is hereby corrected as shown below:

Title page,
Item [54], delete "CARD READER AND METHOD OF INSTALLING A CARD READER", and insert -- A CARD READER INCLUDING A FOREIGN MATERIAL REMOVAL PASSAGE/OPENING --.

Title page,
Item [56] References Cited, U.S. PATENT DOCUMENTS, first reference, delete "Gonest" and insert -- Genest --.

Column 1,
Lines 1-2, delete "CARD READER AND METHOD OF INSTALLING A CARD READER", and insert -- A CARD READER INCLUDING A FOREIGN MATERIAL REMOVAL PASSAGE/OPENING --.

Column 1,
Line 8, after "6,042,010,", insert -- on March 28, 2000 --.

Column 4,
Line 39, delete "BP", and insert -- 8P --.
Line 43, delete "BP", and insert -- 8P --.

Column 12, claim 5,
Line 8, after "slot" (second occurrence), insert --, -- (comma).

Signed and Sealed this

Second Day of October, 2001

Attest:

*Nicholas P. Godici*

NICHOLAS P. GODICI
*Attesting Officer*  *Acting Director of the United States Patent and Trademark Office*